(12) United States Patent
Yamagata et al.

(10) Patent No.: US 7,432,982 B2
(45) Date of Patent: Oct. 7, 2008

(54) OSD INSERT CIRCUIT

(75) Inventors: Takatsugu Yamagata, Hokkaido (JP); Takahisa Hatano, Hokkaido (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 484 days.

(21) Appl. No.: 10/568,651

(22) PCT Filed: Sep. 17, 2004

(86) PCT No.: PCT/JP2004/014023

§ 371 (c)(1),
(2), (4) Date: Feb. 16, 2006

(87) PCT Pub. No.: WO2005/029851

PCT Pub. Date: Mar. 31, 2005

(65) Prior Publication Data

US 2006/0285016 A1      Dec. 21, 2006

(30) Foreign Application Priority Data

Sep. 19, 2003    (JP) ............................... 2003-327785

(51) Int. Cl.
*H04N 5/50* (2006.01)
*G09G 5/00* (2006.01)

(52) U.S. Cl. ........................................ 348/569; 345/213

(58) Field of Classification Search ................. 348/569, 348/600, 589, 468; 345/629, 632, 636, 638, 345/211–213

See application file for complete search history.

(56) References Cited

U.S. PATENT DOCUMENTS 5,325,183 A * 6/1994 Rhee ........................... 348/578

(Continued)

FOREIGN PATENT DOCUMENTS

JP          5-344438 A     12/1993

(Continued)

OTHER PUBLICATIONS

Supplementary European Search Report for Application EP 04 77 3407, dated Jan. 16, 2008.

(Continued)

*Primary Examiner*—M. Lee
(74) *Attorney, Agent, or Firm*—RatnerPrestia

(57) ABSTRACT

An On-Screen-Display (OSD) insert circuit includes an OSD signal generator for generating a switching signal and an analog additional image signal based on a first clock signal, an analog-to-digital converter for converting the generated additional image signal into a digital additional image signal based on a second clock signal as a sampling clock signal, a switching circuit for switching between a digital video signal and the digital additional image signal based on the switching signal, and a control-signal generator operable to generate the second clock signal. The digital video signal has a horizontal synchronizing signal. The control-signal generator is operable to reset the first clock signal with a signal having a predetermined phase difference including zero with reference to the horizontal synchronizing signal, and to generate the second clock signal so that a phase of the second clock signal is adjusted with respect to the horizontal synchronizing signal. This OSD insert circuit can insert the analog additional image signal into the digital video signal without converting the digital video signal into an analog signal.

7 Claims, 5 Drawing Sheets

U.S. PATENT DOCUMENTS

| | | | |
|---|---|---|---|
| 5,493,340 A * | 2/1996 | Kim | 348/569 |
| 5,801,789 A * | 9/1998 | Zeidler et al. | 348/589 |
| 6,300,982 B1 | 10/2001 | Koh | |
| 6,310,597 B1 | 10/2001 | Kim | |
| 6,559,892 B1 | 5/2003 | Kikuchi | |
| 6,816,171 B2 * | 11/2004 | Kim | 345/699 |

FOREIGN PATENT DOCUMENTS

| | | | |
|---|---|---|---|
| JP | 7-181912 A | 7/1995 | |
| JP | 10-98747 A | 4/1998 | |
| JP | 2000-224477 A | 8/2000 | |

OTHER PUBLICATIONS

International Search Report for PCT/JP2004/014023, dated Dec. 14, 2004.

* cited by examiner

OSD INSERT CIRCUIT

This application is a U.S. national phase application of PCT International application PCT/JP2004/014023.

TECHNICAL FIELD

The present invention relates to an On-Screen-Display (OSD) insert circuit for inserting an additional image, such as a teletext or a menu, into a video signal and for displaying the image for user's adjustment.

BACKGROUND ART

Display apparatuses, such as television sets or monitors, may include On-Screen-Display (OSD) insert circuits for displaying an additional image, such as a state of the apparatuses, a screen for user's adjustment, or a teletext. The OSD insert circuits insert an additional image signal, such as the teletext or the menu, into a video signal displayed on the display apparatuses for user's adjustment. A conventional OSD insert circuit for inserting an analog additional image signal into an analog video signal is disclosed in Japanese Patent Laid-Open Publication No. 5-344438.

In the conventional OSD insert circuit, both of the video signal and the additional image signal are analog signals. The conventional OSD insert circuit can not handle a digital video signal. Thus, in a digitally-controlled display apparatus, such as a liquid crystal television set necessarily converts the digital video signal into an analog video signal, which is originally unnecessary for the digital video signal, inserts the additional image signal into the converted analog video signal, and converts it into a digital signal in order to insert the additional image signal. These operations raise a cost and provide performance degradation.

SUMMARY OF THE INVENTION

An On-Screen-Display (OSD) insert circuit includes an OSD signal generator for generating a switching signal and an analog additional image signal based on a first clock signal, an analog-to-digital converter for converting the generated additional image signal into a digital additional image signal based on a second clock signal as a sampling clock signal, a switching circuit for switching between a digital video signal and the digital additional image signal based on the switching signal, and a control-signal generator operable to generate the second clock signal. The digital video signal has a horizontal synchronizing signal. The control-signal generator is operable to reset the first clock signal with a signal having a predetermined phase difference including zero with reference to the horizontal synchronizing signal, and to generate the second clock signal so that a phase of the second clock signal is adjusted with respect to the horizontal synchronizing signal.

This OSD insert circuit can insert the analog additional image signal into the digital video signal without converting the digital video signal into an analog signal.

DETAILED DESCRIPTION OF THE PREFERRED EMBODIMENT

Exemplary Embodiment 1

Figure 1:
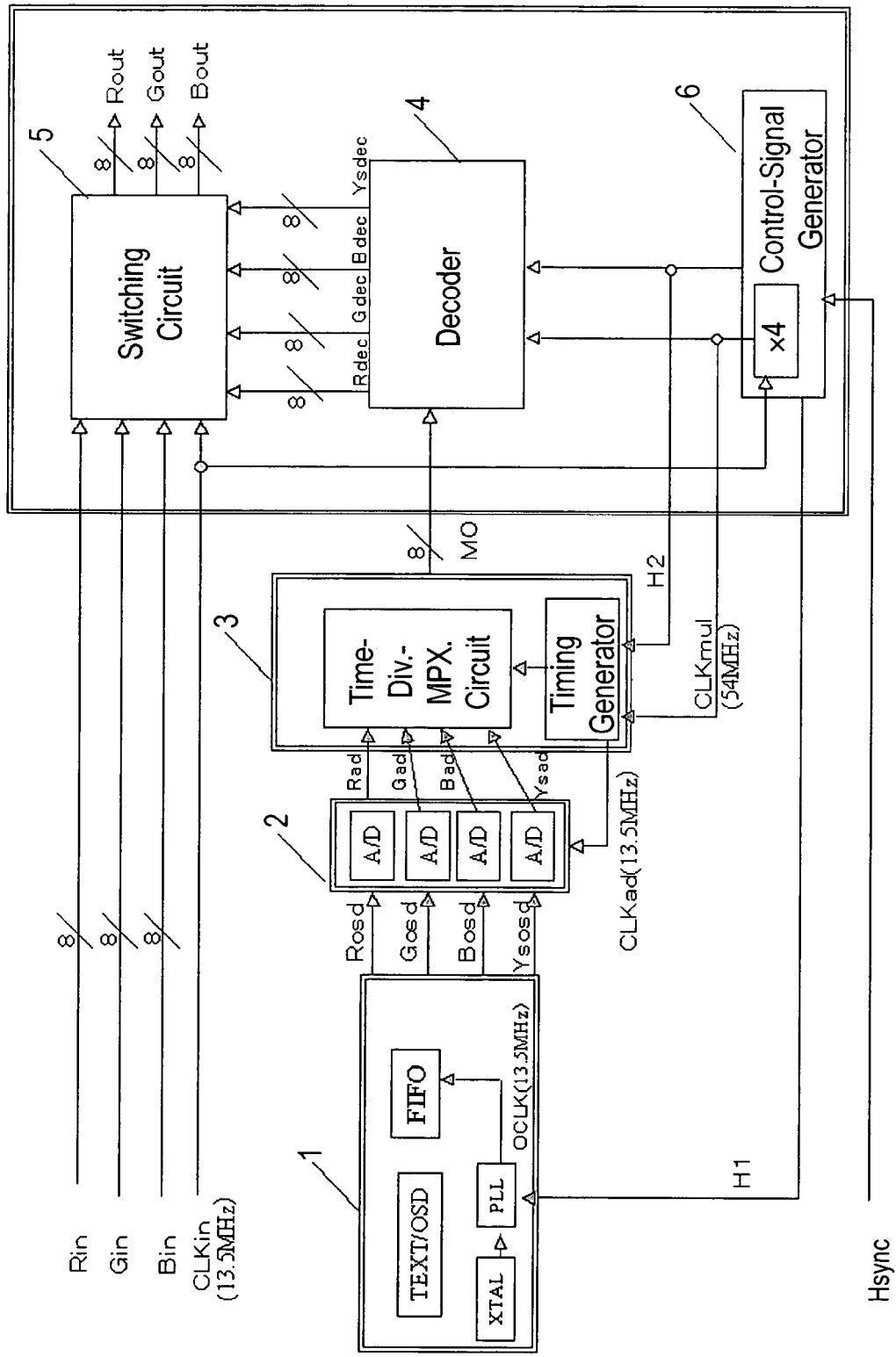
FIG. 1 is a block diagram of an On-Screen-Display (OSD) insert circuit in accordance with Exemplary Embodiment 1 of the present invention.

FIG. 1 is a block diagram of an On-Screen-Display (OSD) insert circuit in accordance with Exemplary Embodiment 1 of the present invention. Based on a reference clock signal having a predetermined frequency, OSD signal generator 1 outputs switching signal Ysosd and analog additional image signals Rosd, Gosd, and Bosd indicating a state of an apparatus of analog three colors of RGB, a screen for user's adjustment, and teletext. Analog-to-digital (A/D) converter 2 converts the analog additional image signal output from OSD signal generator 1 into a digital additional image signal. Time-division-multiplexing circuit 3 time-multiplexes the additional image signal output from A/D converter 2. Decoder 4 decodes a signal output from time-division-multiplexing circuit 3 and outputs signals Rdec, Gdec, and Bdec. Switching circuit 5 switches between signals Rdec, Gdec, and Bdec output from decoder 4 and input digital video signals Rin, Gin, and Bin by using switching signal Ysdec output from decoder 4. Control-signal generator 6 generates signals H1 and H2 for controlling OSD signal generator 1 and time-division-multiplexing circuit 3 based on clock signal CLKin and a horizontal synchronizing signal Hsync of the input digital video signals. According to Embodiment 1, the input digital video signals are standard component television signals of a digital standard, and the frequency of clock signal CLKin is 13.5 MHz.

Figure 2:
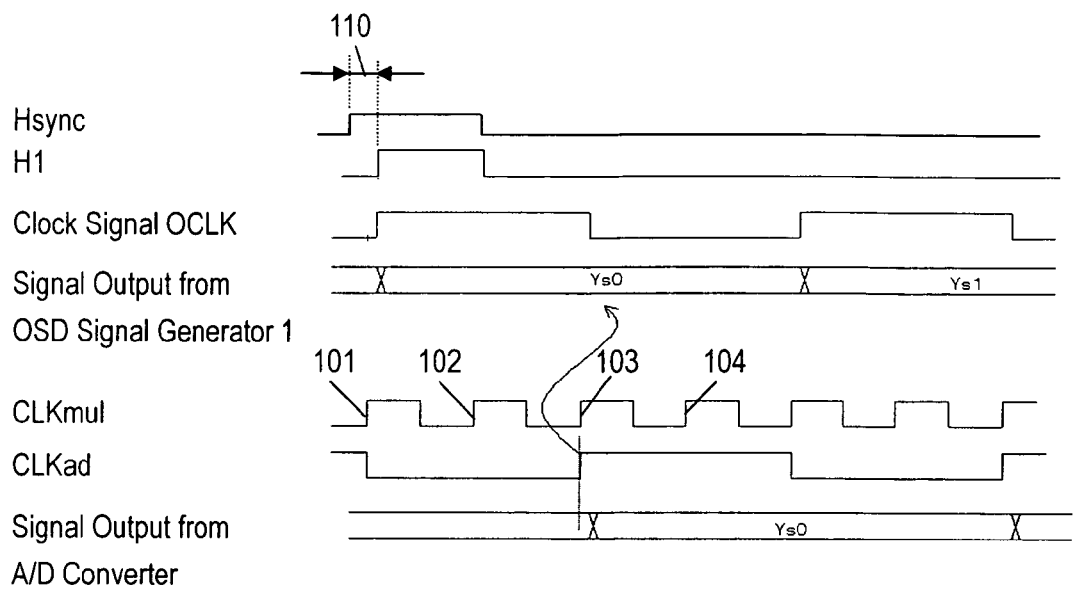
FIGS. 2 to 5 are timing charts showing an operation of an OSD signal generator and an A/D converter of the OSD insert circuit in accordance with Embodiment 1.
Figure 3:
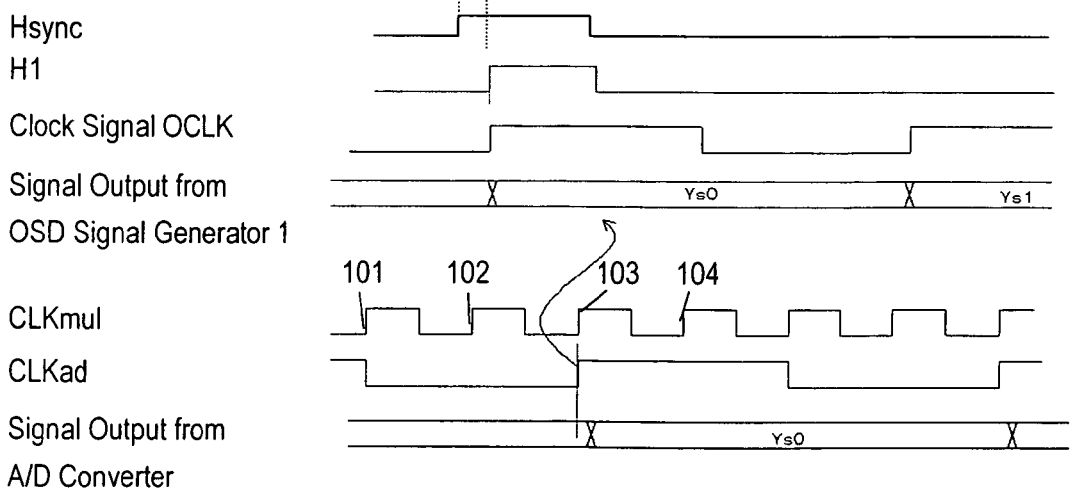
Figure 4:
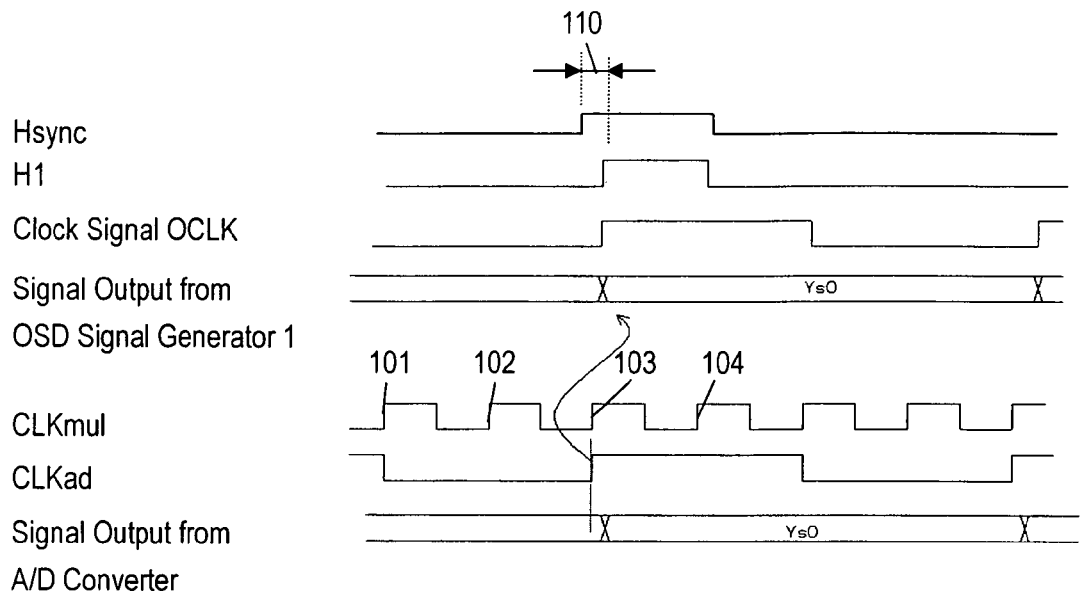
Figure 5:
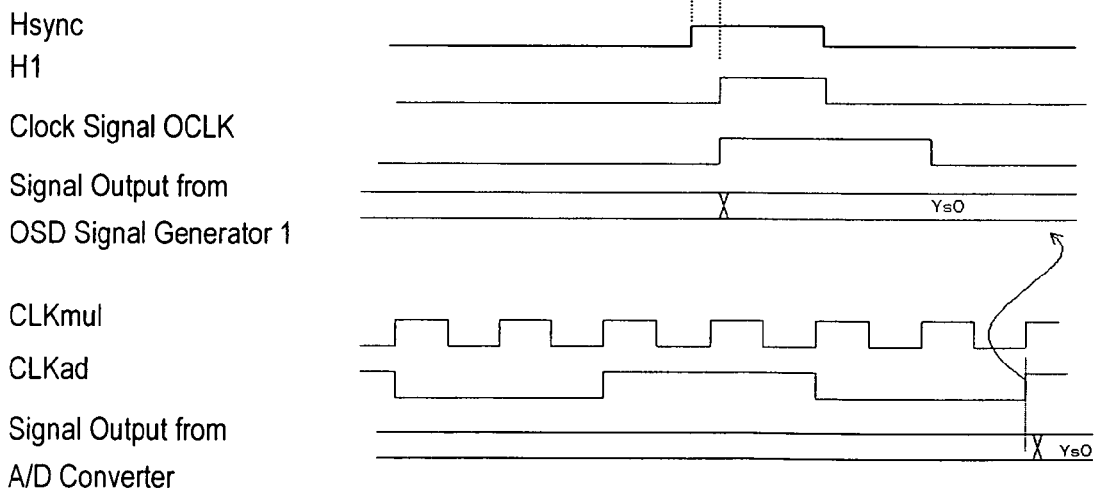
Figure 6:
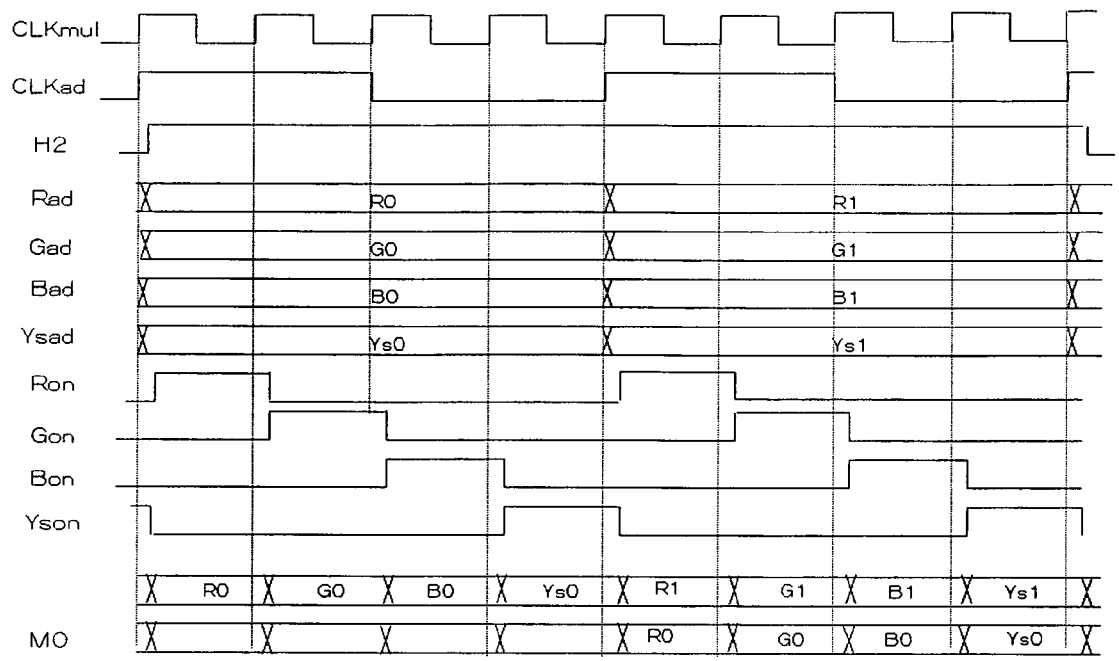
FIG. 6 is a timing chart showing an operation of a time-division-multiplexing circuit of the OSD insert circuit in accordance with Embodiment 1.
Figure 7:
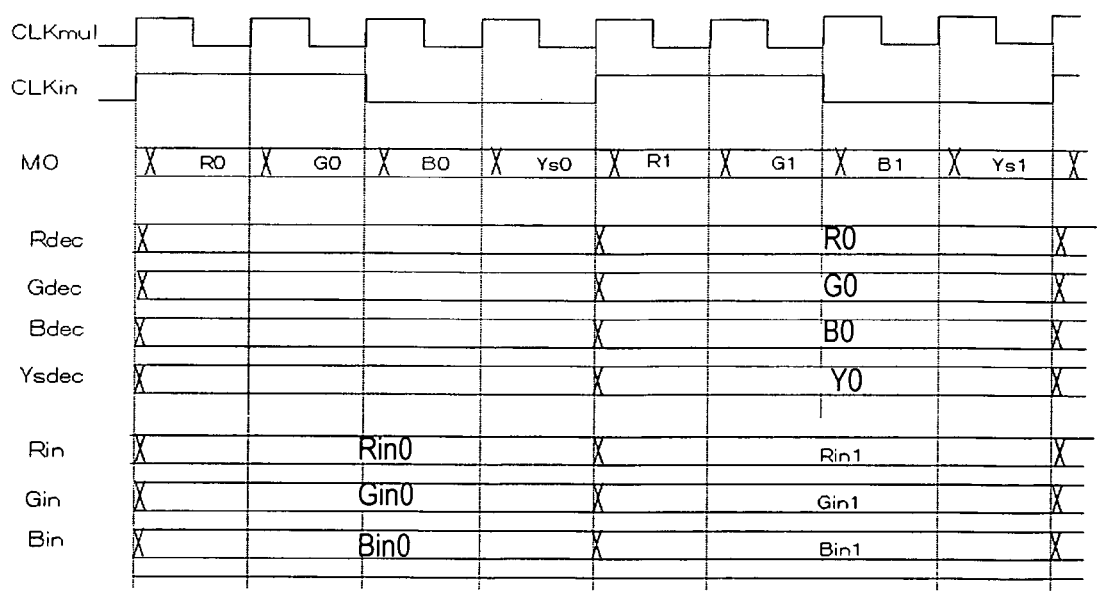
FIG. 7 is a timing chart showing an operation of a decoder of the OSD insert circuit in accordance with Embodiment 1.

FIGS. 2 to 5 are timing charts showing an operation of OSD signal generator 1 and A/D converter 2 of the OSD insert circuit in accordance with Embodiment 1. Internal reference clock signal OCLK of OSD signal generator 1 is not generally supplied from outside, but is generated by a built-in Phase-Locked-Loop (PLL), thus not being synchronized with clock signal CLKin of the digital video signal. Control-signal generator 6 generates signal H1 having a frequency identical to that of horizontal synchronizing signal Hsync of the input video signal and having predetermined phase difference 110 including zero with reference to signal Hsync, and supplies the signal H1 to OSD signal generator 1. OSD signal generator 1 resets reference clock signal OCLK with signal H1. According to Embodiment 1, the frequency of reference clock signal OCLK is determined to be 13.5 MHz which is identical to that of clock signal CLKin of the digital video signal. Control-signal generator 6 generates signal H2, a reference of the time-division-multiplexing, from horizontal synchronizing signal Hsync, and multiplies the frequency of clock signal CLKin of the input digital video signal by four, thereby generating control clock signal CLKmul having a frequency of 54 MHz. Control-signal generator 6 supplies signal H2 and control clock signal CLKmul to time-division-multiplexing circuit 3. Time-division-multiplexing circuit 3 supplies clock signal CLKad of 13.5 MHz produced by frequency-dividing control clock signal CLKmul by four, to A/D converter 2 as a sampling clock signal. The time at which A/D converter 1 captures an output of OSD signal generator 1 is determined by a phase of signal H1. The phase of signal H1 can be adjusted by a period of clock signal CLKmul. FIGS. 2 to 5 are timing charts showing the timing of the output of OSD signal generator 1 and a signal of A/D converter 2. The phase of signal H1 for resetting reference clock signal OCLK of OSD signal generator 1 is adjusted by ¼ of the period of reference clock signal OCLK of OSD signal generator 1 (i.e., the period of clock signal CLKmul). The phase of signal H1 can be adjusted by the period of clock signal CLKmul, as shown in FIG. 4. In this case that rising edge 105 of signal H1 matches rising edge 103 out of four rising edges 101 to 104 of clock signal CLKmul, a time point when the output of OSD signal generator 1 changes matches substantially a time point when the signal input to A/D converter 2 is captured at the sampling clock signal. At this moment, a jitter of the signal output from OSD signal generator 1 may cause a timing error most if rising edge 103 out of four rising edges 101 to 104 of signal CLKmul matching signal H1 when A/D converter 2 captures the signal output from OSD signal generator 1. To prevent this error, rising edge 105 of signal H1 matches rising edge 103 of signal CLKmul, as shown in FIG. 2, to allow the phase of signal H1 to be set to a time point hardly producing the timing error, namely, the middle point of the time points when the output of OSD signal generator 1 changes. This setting increases a tolerable of the jitter for A/D converter 2, so that the signal can be captured without generating the timing error. The signal output from A/D converter 2 is time-multiplexed by time-division-multiplexing circuit 3 based on signal H2 generated by control-signal generator 6. As shown in FIG. 6, time-division-multiplexing circuit 3 time-multiplexes the signals Rad, Gad, Bad, and Ysad output from A/D converter 2 based on selection pulse Ron, Gon, Bon, and Yson generated based on signal H2 synchronized with horizontal synchronizing signal Hsync. Signal MO output from time-division-multiplexing circuit 3 is decoded by decoder 4, as shown in FIG. 7, and is adjusted in its phase. Then, decoder 4 outputs digital additional image signals Rdec, Gdec, and Bdec and switching signal Ysdec. Switching circuit 5 inserts digital additional signals Rdec, Gdec, and Bdec into digital video signal Rin, Gin, and Bin by switching between digital additional signals Rdec, Gdec, and Bdec and digital video signals Rin, Gin, and Bin based on switching signal Ysdec. This operation inserts the additional image signals into the digital video signals without generating an unstable image caused due to the timing error.

The additional signal of OSD can be inserted digitally into the video signal, so that D/A conversion, analog insertion of OSD additional image signal, and A/D conversion, which are originally unnecessary processes for the digital video signal, are not needed in a digital control system, thus improving performance and reducing costs.

According to Embodiment 1, the input digital video signal and the signal output from OSD signal generator 1 are RGB signals, however, may be YUV signals. According to a condition of hard ware, such as the number of pins of ICs, the signal output from A/D conversion 2 may be directly inserted into switching circuit 5 without through time-division-multiplexing circuit 3 and decoder 4. Control-signal generator 6 generates clock signal CLKmul having a frequency four times higher than that of clock signal CLKin of the video signal, and supplies the signal CLKmul to time-division-multiplexing circuit 3. The frequency of clock signal CLKmul is determined depending on the number of the additional image signals.

Exemplary Embodiment 2

Figure 8:
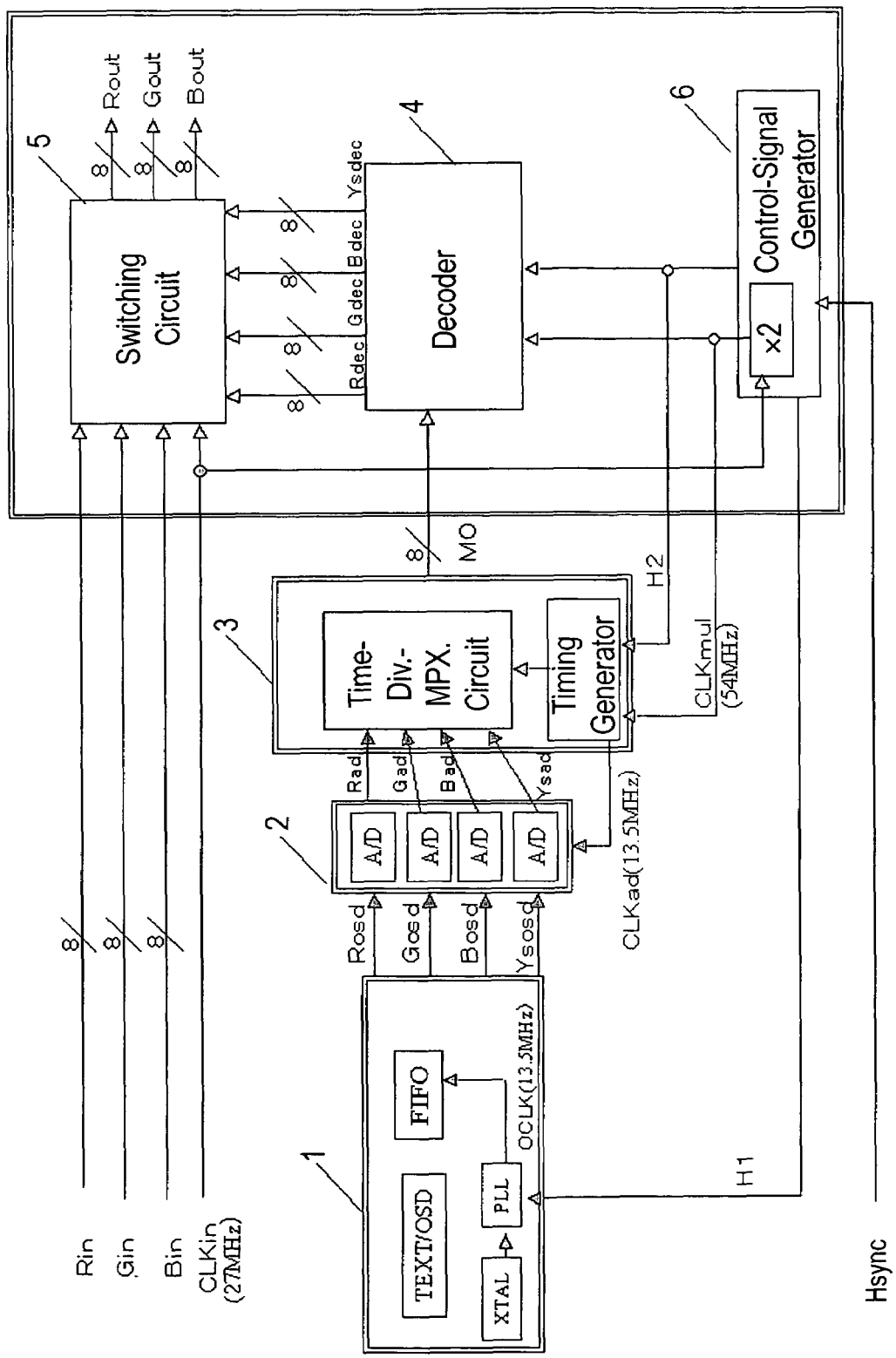
FIG. 8 is a block diagram of an OSD insert circuit in accordance with Exemplary Embodiment 2 of the invention.

FIG. 8 is a block diagram of an OSD insert circuit in accordance with Exemplary Embodiment 2 of the present invention. Elements similar to those of the OSD insert circuit according to Embodiment 1 shown in FIG. 1 are denoted by the same reference numerals, and their description will be omitted. The frequency of clock signal CLKin of an input digital video signal is set to 27 MHz, and the frequency of internal reference clock signal OCLK of OSD signal generator 1 is set to 13.5 MHz which is ½ of the frequency of clock signal CLKin of the digital video signal. Control-signal generator 6 supplies synchronizing signal H2, a reference of time-multipleaxing, synchronized with horizontal synchronizing signal Hsync, and control clock signal CLKmul of 54 MHz produced by frequency-doubling clock signal CLKin of the digital video signal, to time-division-multiplexing circuit 3. That is, the frequency ratio of clock signal CLKmul to clock signal CLKin is different from the frequency ratio of clock signal OCLK to clock signal CLKin. This arrangement allows the digital additional signal output from OSD signal generator 1 to be inserted into the video signal digitally without generating a timing error even if the frequency of the clock signal of the digital video signal is high. For example, if clock signal CLKin of the digital video signal is 27 MHz according to Embodiment 2, the OSD insert circuit of Embodiment 1 shown in FIG. 1 requires the high frequency, 108 MHz, of clock signal CLKmul generated from control-signal generator 6, which is four times higher than the clock signal of the video signal, thus hardly implemented. In this case, the OSD insert circuit can be implemented easily by setting the frequency of clock signal CLKmul two times higher than that of the clock signal of the video signal. However, in this case, the frequency of clock signal OCLK of the additional signal of the OSD is ½ of that of clock signal CLKin of the video signal, thus providing the additional signal with a resolution of ½ of that of the digital video signal.

INDUSTRIAL APPLICABILITY

An OSD insert circuit according to the present invention can insert an analog additional signal of OSD digitally into a digital video signal, thus improving performance and reducing costs.

The invention claimed is:

1. An On-Screen-Display (OSD) insert circuit comprising:
   an OSD signal generator for generating a switching signal and an analog additional image signal based on a first clock signal;
   an analog-to-digital converter for converting the generated additional image signal into a digital additional image signal based on a second clock signal as a sampling clock signal;
   a switching circuit for switching between a digital video signal and the digital additional image signal based on the switching signal as to selectively output the digital video signal and the digital additional image signal; and
   a control-signal generator, wherein the digital video signal has a horizontal synchronizing signal, the control-signal generator being operable to
      reset the first clock signal with a signal having a predetermined phase difference including zero with reference to the horizontal synchronizing signal, and
      generate the second clock signal so that a phase of the second clock signal is adjusted with respect to the horizontal synchronizing signal.

2. The OSD insert circuit of claim 1, further comprising:
a time-division-multiplexing circuit for time-multiplexing the switching signal and the digital additional image signal based on a third clock signal; and
a decoder for decoding the time-multiplexed switching signal and the time-multiplexed additional image signal,
wherein the switching circuit switches, based on the decoded switching signal, between the digital video signal and the decoded additional image signal as to selectively output the digital video signal and the decoded additional image signal, and
wherein the control-signal generator is operable to generate the third clock signal.

3. The OSD insert circuit of claim 2,
wherein the digital video signal further has a fourth clock signal,
wherein the control-signal generator is operable to generate the third clock signal by multiplying a frequency of the fourth clock signal.

4. The OSD insert circuit of claim 3, wherein the control-signal generator is operable to adjust the phase of the second clock signal based on the third clock signal.

5. The OSD insert circuit of claim 4, wherein the control-signal generator is operable to generate the second clock signal by frequency-dividing the fourth clock signal.

6. The OSD insert circuit of claim 5, wherein a frequency ratio of the third clock signal to the fourth clock signal is different from a frequency ratio of the second clock signal to the fourth clock signal.

7. The OSD insert circuit of claim 6, wherein the control-signal generator is operable to
generate the third clock signal by multiplying the frequency of the fourth clock signal by two, and
generate the second clock signal by dividing the frequency of the fourth clock signal by four.

* * * * *